United States Patent [19]

Suzuki

[11] Patent Number: 5,327,246
[45] Date of Patent: Jul. 5, 1994

[54] PIXEL DEFECT REMOVING CIRCUIT FOR SOLID-STATE IMAGE PICKUP DEVICE

[75] Inventor: Norio Suzuki, Osaka, Japan

[73] Assignee: Matsushita Electric Industrial Co., Ltd., Osaka, Japan

[21] Appl. No.: 824,523

[22] Filed: Jan. 23, 1992

[51] Int. Cl.$^5$ .................................... H04N 5/335
[52] U.S. Cl. ................................................ 348/246
[58] Field of Search ............... 358/213.17, 213.15, 358/213.11, 213.18, 160, 162, 163; 382/1, 8, 54, 57, 52; H04N 5/335

[56] References Cited

U.S. PATENT DOCUMENTS

| | | | |
|---|---|---|---|
| 4,167,754 | 9/1979 | Nagumo et al. | 358/167 |
| 4,454,541 | 6/1984 | Duschl | 358/106 |
| 4,473,845 | 9/1984 | Davy | 358/163 |
| 4,639,775 | 1/1987 | Cohen | 358/106 |
| 4,734,774 | 3/1988 | Skaggs et al. | 358/213.15 |
| 4,805,023 | 2/1989 | Younse et al. | 358/213.17 |
| 4,833,723 | 5/1989 | Loveridge et al. | 382/53 |
| 5,029,226 | 7/1991 | Klein et al. | 382/50 |
| 5,047,861 | 9/1991 | Houchin et al. | 358/213.15 |
| 5,086,484 | 2/1992 | Katayama et al. | 382/50 |
| 5,189,710 | 2/1993 | Holt | 382/22 |

FOREIGN PATENT DOCUMENTS

| | | | |
|---|---|---|---|
| 3121599A1 | 12/1982 | Fed. Rep. of Germany | H04N 5/21 |
| 3629009A1 | 3/1988 | Fed. Rep. of Germany | H04N 5/217 |

Primary Examiner—Joseph Mancuso
Assistant Examiner—Tuan V. Ho
Attorney, Agent, or Firm—Wenderoth, Lind & Ponack

[57] ABSTRACT

From an input video signal, a pixel value of a pixel of notice noted at a certain time t and a proximal pixel group adjacent two-dimensionally around the pixel of notice are sampled, and maximum and minimum values from the proximal pixel value group are selected as candidate pixel values. By performing a specific operation between the pixel value of the pixel of notice and the candidate pixel value group, a judgment is made as to whether a pulse noise is contained in the pixel of notice. On the basis of the judgement, a pixel value is selected from among the pixel value of the pixel of notice and the candidate pixel values and delivered.

15 Claims, 6 Drawing Sheets

PIXEL DEFECT REMOVING CIRCUIT FOR SOLID-STATE IMAGE PICKUP DEVICE

BACKGROUND OF THE INVENTION

1. Field of the Invention

The present invention relates to a circuit for removing pulse noise components superposed on a video signal delivered from a solid-state image pickup device having pixel defects.

2. Description of the Prior Art

In image pickup devices such as video cameras, solid-state pickup devices are often used in the optoelectric conversion unit. When the output signal of the solid-state image pickup device is displayed by a monitor device and the video signal is observed, pixel defects known as white spots or black spots are sometimes observed in the picture. Such pixel defects are very obvious even if they are small in size, and pickup devices having pixel defects cannot be used as a commercial product, so that the production yield is lowered. Also, pixel defects can occur even after shipping of products. These problems are peculiar to the solid-state image pickup device, and present serious obstacles to their use.

Hitherto, as the means for solving the above problems, in a first example, as shown in U.S. Pat. No. 4,473,845, onset positions of pixel defects are stored in a PROM or the like, and the pixel defects are corrected by using the preceding and succeeding pixels on the scanning line at a timing when the output of the solid-state image pickup device corresponds to the stored position in the PROM.

In this first prior art example, the PROM is required as the means for storing the position of pixel defects. However, since the position of the pixel defects occurring in the solid-state pickup device varies from device to device, it is necessary to investigate the pixel defect position in each device and prepare a corresponding PROM, which requires too much labor. Further, this method is useless for pixel defects occurring after shipping of products.

As a second example, as disclosed in the Japanese Laid-open Patent Application Sho. 61-261974, pixel defects are detected by comparison of a pixel of notice with adjacent pixels positioned in the scanning line direction or in the direction vertical to the scanning line direction with respect to the pixel of notice, and the signal value of the pixel of notice is replaced by the value of one preceding pixel or the mean value of the preceding and succeeding pixels, so that the detected pixel defect is corrected.

In the second prior art example, when detecting pixel defects, attention is paid only to the scanning line direction or the direction vertical to the scanning line direction. However, since no comparison is made with respect to pixels in oblique directions, fine line segments in oblique directions to the scanning line are detected as pixel defects, and all line segments in oblique directions may be removed. Also, when correcting pixel defects, the pixel value is replaced by one preceding pixel or the mean value of preceding and succeeding pixels, but if there is a pixel defect on a fine line segment extending in the direction vertical to the scanning line direction, the line segment may be cut off as a result of correction.

SUMMARY OF THE INVENTION

It is hence a primary object of the invention to present a device for favorably removing pulsive pixel defects existing only on one pixel, without removing the fine line segments in oblique directions to the scanning line direction and without sacrificing the fine line segments extending in the vertical direction to the scanning line direction, being effective relative to pixel defects occurring after shipping of products, and without requiring fabrication of a PROM corresponding to each device.

To achieve the above object, the invention presents a pixel defect removing circuit which comprises a pixel value group sampler for receiving a video signal, and delivering a pixel value of a pixel of notice noted at a certain time t and a group of proximal pixel values consisting of pixel values of proximal pixels adjacent two-dimensionally around the pixel of notice, a candidate pixel value group sampler for delivering a group of plural candidate pixel values as candidates for a pixel value to be finally delivered from the circuit out of the group of proximal pixel values, a noise detector for performing an operation between the pixel value of the pixel of notice and the candidate pixel values to judge whether a pulse noise is included in the pixel of notice, and delivering a pixel selection signal to instruct which pixel value should be delivered out of the pixel value of the pixel of notice and the candidate pixel values on the basis of the result of judgement, and a pixel value selector for selecting and delivering one pixel value from among the pixel value of the pixel of notice and the candidate pixel values on the basis of the pixel selection signal.

In this constitution, the pixel value group sampler may preferably pick up pixel values of $3 \times 3$ pixels out of three continuous scanning lines, and define a central pixel as the pixel of notice and the remaining pixels as the proximal pixels. Further, the candidate pixel value group sampler may preferably deliver, as the candidate pixel values, two pixel values possessing a maximum pixel value and a minimum pixel value, respectively, in the proximal pixels. Meanwhile, the candidate pixel value group sampler may preferably deliver, as the candidate pixel values, two pixel values possessing a maximum value among Po and a smaller one of Pr and Pl, that is, max (min (Pr, Pl), Po), and a minimum value among Po and a larger one of Pr and Pl, that is, min (max (Pr, Pl), Po), supposing a pixel value of a pixel existing at the closest position in a pixel group existing in the right direction on a scanning line containing the pixel of notice to be Pr, a pixel value of a pixel existing at the closest position in a pixel group existing in the left direction on the scanning line to be Pl, and pixel values of pixels excluding Pr and Pl from the proximal pixels to be Po.

This constitution, which does not require the preparation of a PROM corresponding to each device, is effective relative to pixel defects occurring after shipping of products, and makes it possible to favorably remove pulsive pixel defects existing on one pixel only, without removing the fine line segments in the oblique direction to the scanning line and without sacrificing the fine line segments extending in the vertical direction to the scanning line.

DESCRIPTION OF THE PREFERRED EMBODIMENTS

Figure 1:
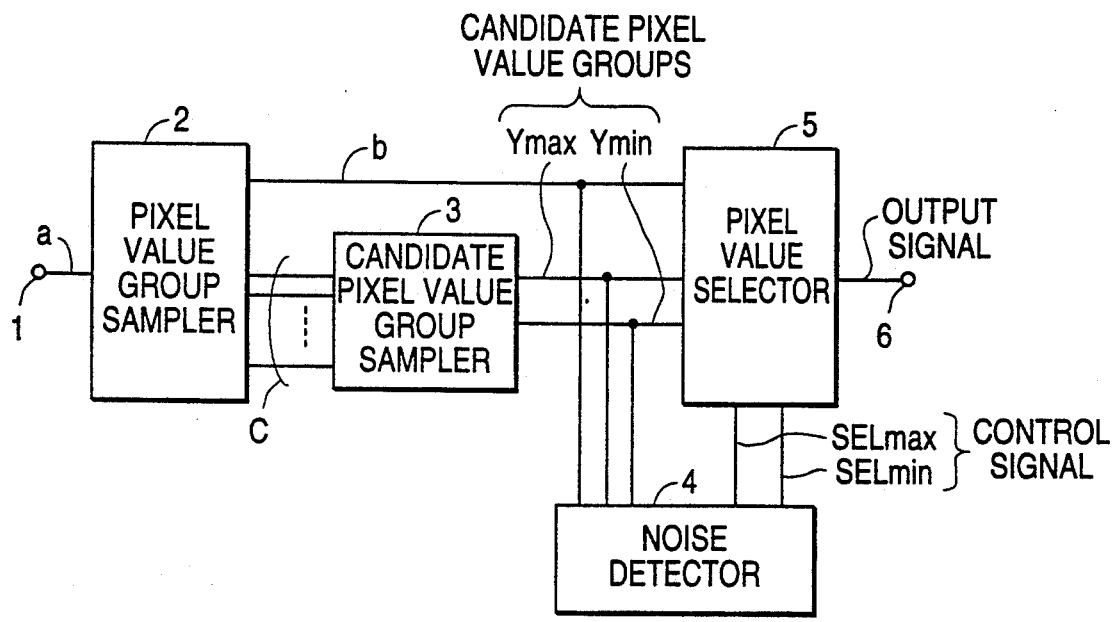
FIG. 1 depicts an overall configuration in an embodiment of the invention.

Referring now to the drawings, one of the embodiments of the invention is described in detail below.

In FIG. 1, a pixel value group sampler 2 receives a video signal a entered through an input terminal 1, and delivers a pixel value b of the pixel of notice and a proximal pixel value group c consisting of pixel values of NxM−1 pixels. The NxM−1 pixels exclude the pixel of notice and include pixels in a pixel group which is adjacent to and two-dimensionally surrounds the pixel of notice and which extends N pixels in the scanning line direction and M pixels in the direction orthogonal to the scanning line.

Figure 2:
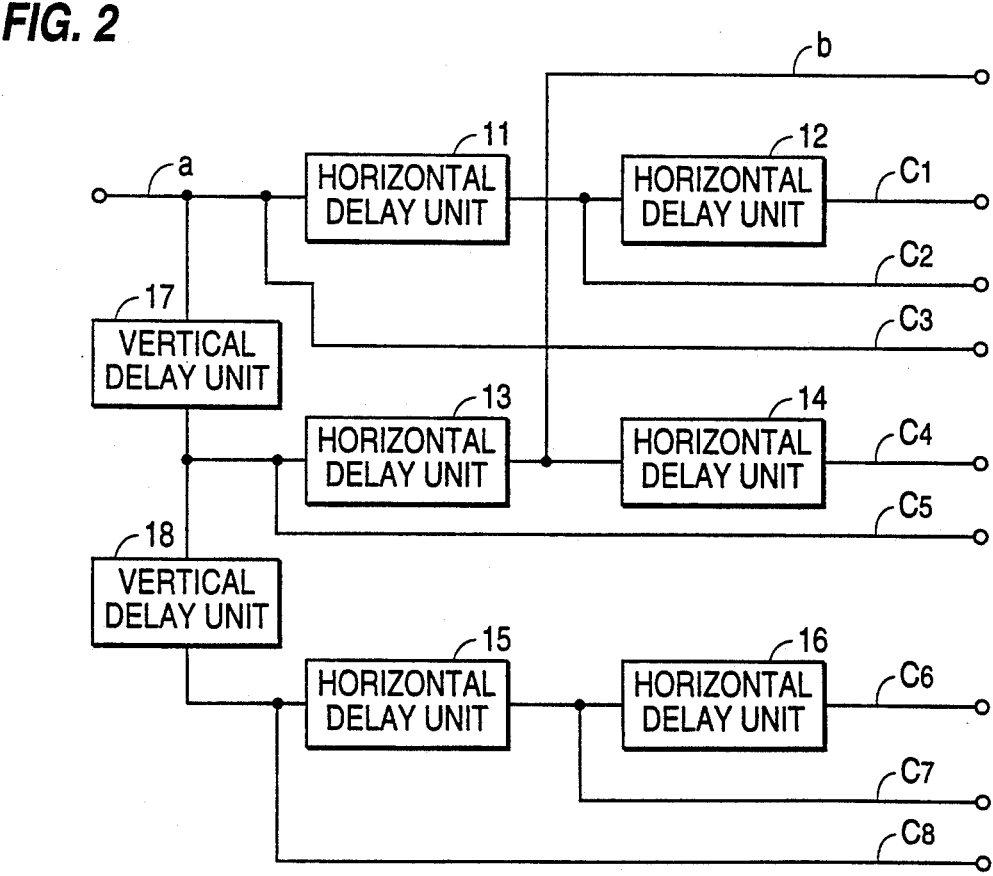
FIG. 2 depicts a configuration of a pixel value group sampler in an embodiment of the invention.
Figure 7:
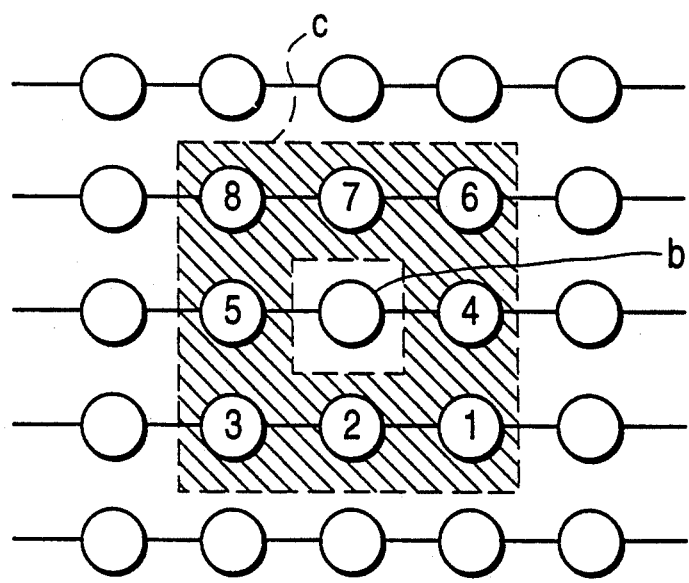
FIG. 7 is a layout diagram of a pixel of notice and proximal pixel group in one embodiment of the invention.

FIG. 2 depicts a specific configuration of the pixel value group sampler 2. In FIG. 2, an example of a composition of M=N=3 is shown to explain the operation of the pixel value group sampler 2, which is composed of two vertical delay units and six horizontal delay units. The horizontal delay unit delivers a signal by delaying the input signal by the scanning time for the portion of, for example, one pixel, while the vertical delay unit is designed to deliver a signal by delaying the input signal by one horizontal scanning time. Meanwhile, FIG. 7 shows a layout example of the pixel of notice on the scanning line and proximal pixel group, in which pixels numbered from 1 to 8 compose the proximal pixel group c, and the pixel of notice b is located in the center of the proximal pixel group.

In FIG. 2, the video signal a is connected to a horizontal delay unit 11, and the output of the horizontal delay unit 11 is connected to a horizontal delay unit 12. When signals are taken out from three positions, that is, the input end of the horizontal delay unit 11, the output end of the horizontal delay unit 11, and the output end of the horizontal delay unit 12, pixel values c3, c2, c1 at positions corresponding to proximal pixels 3, 2, 1 in FIG. 7 are obtained, respectively. The video signal a is also connected to a vertical delay unit 17, and when horizontal delay units 13, 14 are connected in series to the output end of the vertical delay unit 17, similarly, pixel values c5, b, c4 at the positions corresponding to the proximal pixel 5, pixel of notice and proximal pixel 4 in FIG. 7 are obtained. Furthermore, at the output end of the vertical delay unit 17 in FIG. 2, a vertical delay unit 18 is connected, and when horizontal delay units 15, 16 are connected in series to the output end of the vertical delay unit 18, similarly, pixel values c8, c7, c6 at positions corresponding to proximal pixels 8, 7, 6 in FIG. 7 are obtained. When the pixel value group sampler 2 is composed in this manner, the pixel value b of the pixel of notice and the proximal pixel value group c may be delivered simultaneously from plural output terminals.

In FIG. 1, the candidate pixel value group sampler 3 delivers a candidate pixel value group from the proximal pixel value group c delivered simultaneously from the pixel value group sampler 2. The candidate pixel value group is composed of two pixel values, Ymax and Ymin, denoting the maximum pixel value in the proximal pixel value group c to be Ymax and the minimum pixel value to be Ymin.

Figure 3:
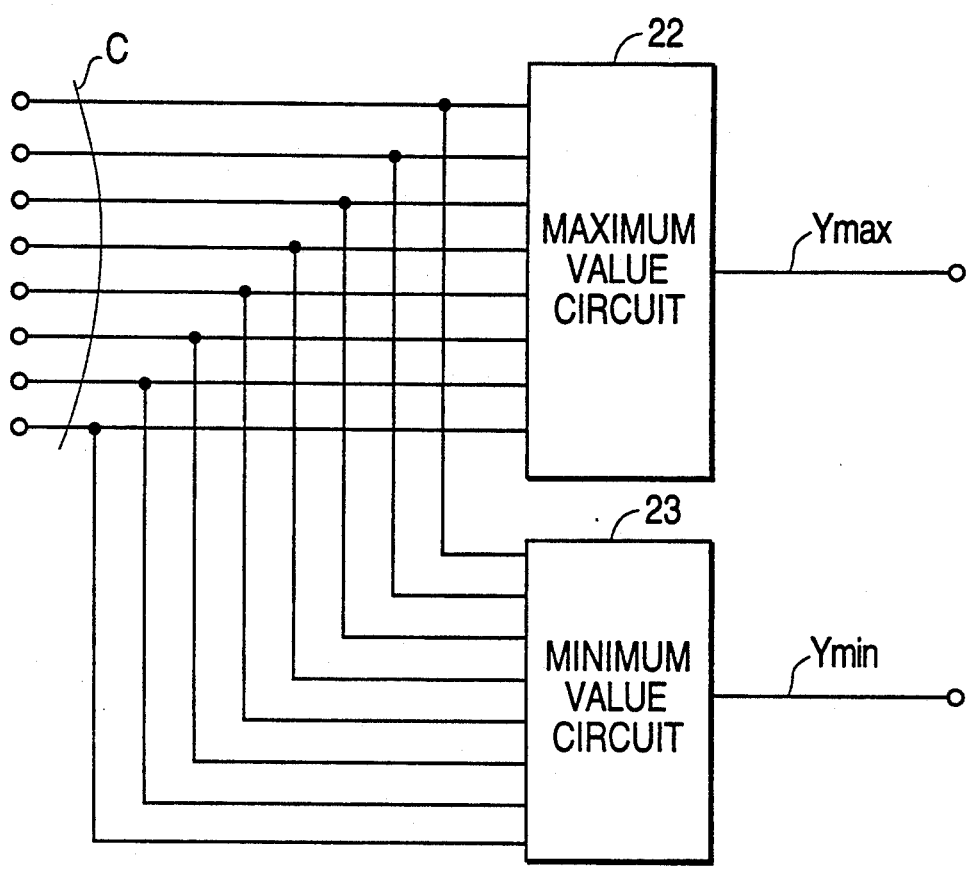
FIG. 3 depicts a configuration of a candidate pixel value group sampler in a first embodiment of the invention.

FIG. 3 is a specific configuration of the candidate pixel value group sampler 3. FIG. 3, in conjunction with the explanation of the pixel value group sampler 2, shows an example of the composition of candidate pixel value group sampler 3 in which the proximal pixel group is composed of 8 pixels, comprising a maximum value circuit 22 having eight input terminal groups and a minimum value circuit 23 having eight input terminal groups. The maximum value circuit 22 samples and delivers the maximum pixel value (Ymax) from among the input proximal pixel value group c. The minimum value circuit 23 samples and delivers the minimum pixel value (Ymin) from among the input proximal pixel value group c.

In FIG. 1, the noise detector 4 judges whether noise is contained in the pixel of notice from the pixel value b of the pixel of notice delivered from the pixel value group sampler 2 and Ymax and Ymin delivered from the candidate pixel value group sampler 3, and delivers the result of judgement as a control signal. The control signal is composed of SELmax which is a signal for selecting Ymax, and SELmin which is a signal for selecting Ymin.

Figure 4:
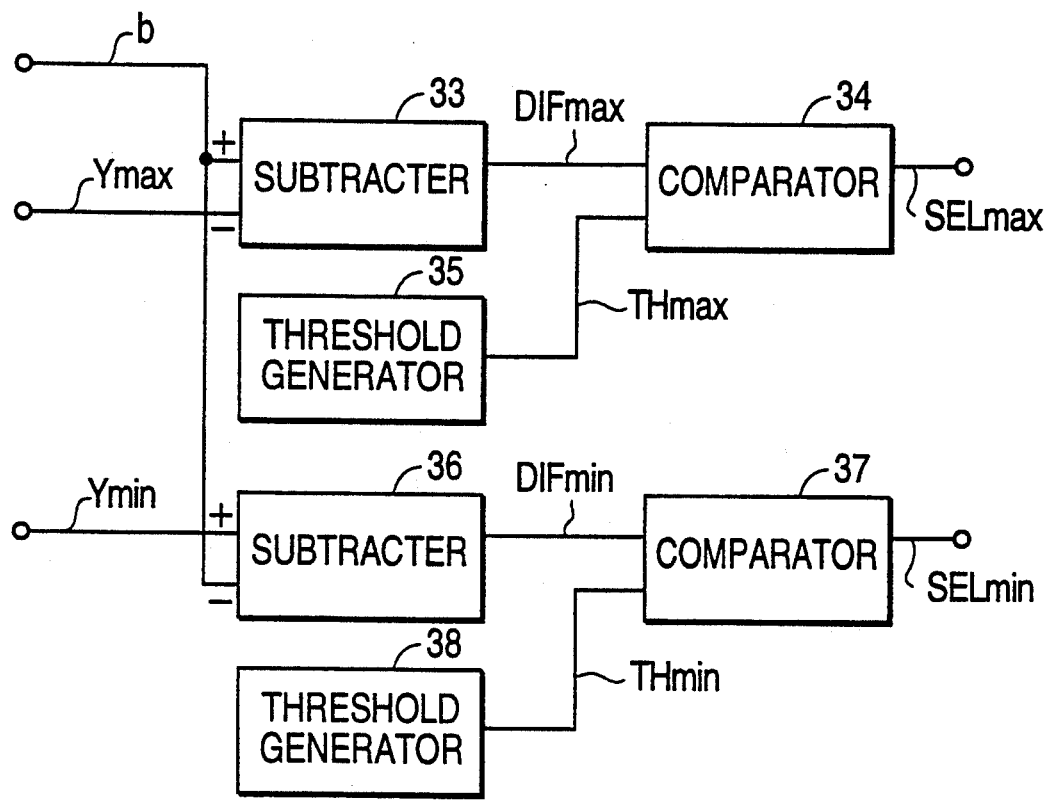
FIG. 4 depicts a configuration of a noise detector in an embodiment of the invention.

FIG. 4 depicts a specific configuration of the noise detector 4, which is composed of two subtractors, two comparators, and two threshold setters. A subtractor 33 subtracts Ymax from the pixel value of the pixel of notice, and generates the difference (hereinafter DIFmax). A comparator 34 compares DIFmax with the threshold value delivered from a threshold generator 35 (THmax hereinafter), and makes active the signal SELmax for selecting Ymax if DIFmax>THmax as Condition 1, and makes SELmax inactive if Condition 1 is not established. A subtractor 36 subtracts the pixel value of the pixel of notice from Ymin, and generates the difference (DIFmin). A comparator 37 compares DIFmin with the threshold value delivered from a threshold generator 38 (THmin), and makes active the signal SELmin for selecting Ymin if DIFmin>THmin as Condition 2, and makes SELmin inactive if Condition 2 is not established.

Generally, due to the spatial low pass filter effect caused by lens a or the like, the amplitude of the high frequency component (detail) of the video signal as the output of optoelectric conversion element is small, and if pulse noise is not contained in the pixel of notice, the differential portion of the proximal pixel group with respect to the pixel of notice becomes small. Therefore, if THmax and THmin are set extremely small for the maximum value of the pixel value, the detail component of the video signal may be lost, or if set extremely large, the defect itself cannot be detected, and hence it is required to set properly.

In FIG. 1, the pixel value selector 5 receives the pixel of notice delivered from the pixel value group sampler 2, Ymax and Ymin delivered from the candidate pixel value group sampler 3, and SELmax, SELmin delivered from the noise detector 4, and delivers any one of the pixel value of pixel of notice, Ymax and Ymin to the output terminal 1 on the basis of SELmax, SELmin.

Figure 5:
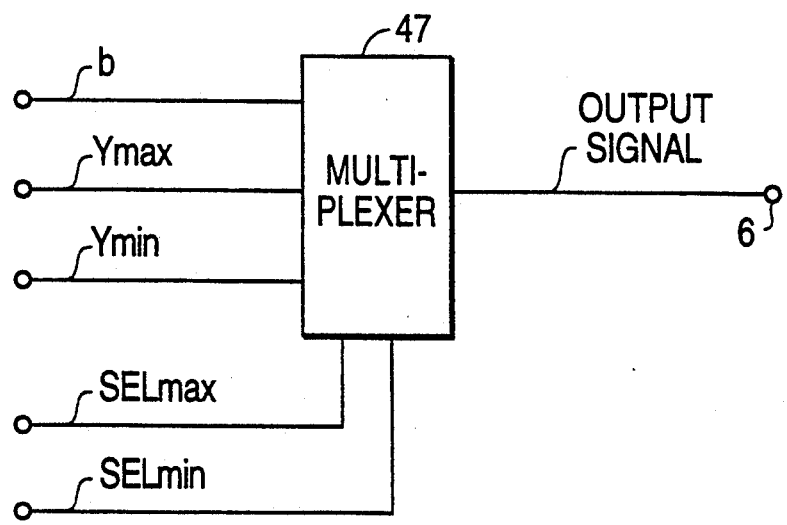
FIG. 5 depicts a configuration of a pixel value detector in an embodiment of the invention.

FIG. 5 is a specific configuration of the pixel value selector 5, which is composed of one multiplexer 47. The multiplexer 47 receives the pixel value of the pixel of notice, Ymax and Ymin, and when both SELmax and SELmin are both inactive, the pixel value b of the pixel of notice is delivered to the output terminal 6, and when SELmax is active and SELmin is inactive, Ymax is delivered to the output terminal 6, and when SELmax is inactive and SELmin is active, Ymin is delivered to the output terminal 6. As understood from the explanation of the noise detector 4, it is impossible for both SELmax and SELmin to be active at the same time due to the output conditions of SELmax and SELmin.

Figure 8A:
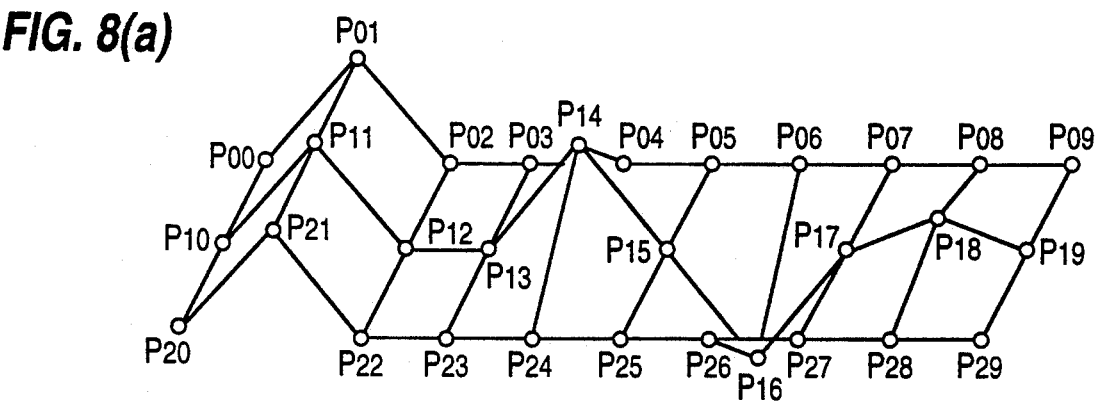
FIGS. 8(a) and 8(b) are explanatory diagrams related to the operation of the first embodiment of the invention.
Figure 8B:
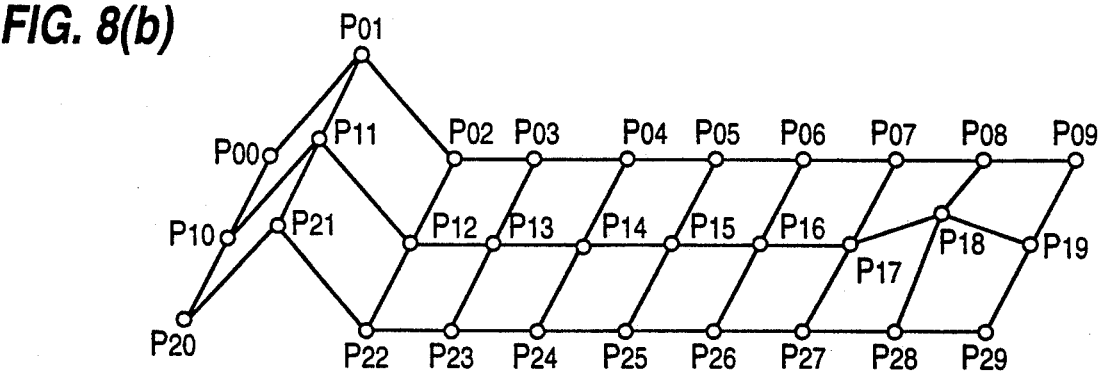

Referring to FIGS. 8(a) and 8(b), the operation of the invention is described below. In FIG. 8(a), all pixel values of P01, P11, P21, P14 are 100, the pixel value of P16 is 0, the pixel value of P18 is 70, and the pixel values of all other pixels are 50, and THmax and THmin are 30, for example.

Supposing the pixel of notice to be P11, Ymax delivered from the candidate pixel value group sampler 3 is 100, and Ymin is 50, and by the noise detector 4, DIFmax is 0 and DImin is −50, and Conditions 1, 2 are not established, and both SELmax and SELmin are inactive, and the pixel value of the pixel of notice P11 is delivered by the pixel value selector 5. When the pixel of notice is P01, P21, similarly, the pixel value of P01 or P21 is delivered, and the line segment in the vertical direction to the scanning line composed of P01, P11, P21 will be preserved. The same holds true also in the line segment in the oblique direction to the scanning line.

By the way, when the pixel of notice is P14, both Ymax and Ymin are 50, and DIFmax is 50 and DIFmin is −50, and only Condition 1 is established, and SELmax is active and SELmin is inactive, and the pixel value selector 5 delivers 50 as pixel value, and P14 is replaced to be flat with respect to the pixel value of the surrounding pixels. If the pixel of notice is P16, contrary to the operation when P14 was the pixel of notice, only Condition 2 is established, and SELmax is inactive and SELmin is active, and the pixel value selector 5 delivers 50 as the pixel value, and P17 is also replaced so as to be flat with respect to the pixel value of the surrounding pixels.

Alternatively, when the pixel of notice is P18, DIFmax is 20 and DIFmin is −20, and either Condition 1 nor 2 is established, and the pixel value selector 5 directly delivers the pixel value of P18 as it is, and the detail portion included in the original video signal is preserved.

Finally, the output as shown in FIG. 8(b) is obtained, and only the pixel defect can be eliminated without spoiling the useful video information.

Incidentally, in the explanation of the pixel value group sampler 2, the horizontal delay unit is supposed to delay for the scanning time of one pixel portion only, but in a single plate color imaging system, color filters may be disposed in stripes in the longitudinal direction. In such a case, by using horizontal delay units for delaying for the portion of the period of the color filters of the same color disposed on stripes, pixel defects can be removed from the output the solid-state image pickup device possessing a striped configuration of color filters.

As a second embodiment, an example is explained next of removing pixel defects contained in the signal delivered from the solid-state pickup device having a color filter arrangement on the basis of single chip CCD color difference method.

In the foregoing first embodiment, that the pixel defect can be removed by comparison between the pixel of notice and proximal pixel group is realized on the first condition that the pixel of notice and its proximal pixel group are of a similar signal type (for example, comparison between brightness signals), and the second condition that the pixel defect occurs independently, and is low in correlation between the defective pixel and proximal pixel. However, nothing has been considered about the color filter arrangement on the basis of the single chip CCD color difference method. In the single chip CCD color difference method, if the output of the solid-state image pickup device is entered in the device of the first embodiment directly, other types of color differential information is contained among the proximal pixels, and the first condition is not established, and therefore it is necessary to sample preliminarily the brightness signal or color difference signal from the output of the solid-state pickup device. To the brightness signal or color difference signal, it is necessary to execute filter processing. However, by passing through the filter, the noise component of the defective pixel diffuses into adjacent pixels, and the second condition is not established, and hence it was difficult to remove the noise in the first embodiment.

To generate the brightness signal from the output of the solid-state pickup device having a color filter array on the basis of the complete color differential linear sequential single chip CCD color system, generally a digital filter is used having the characteristic of $(1+Z^{-1})$, and the color difference signal is generated by using a digital filter having the characteristic of $(1-Z^{-1})$, and therefore the defect component is diffused in the scanning line direction. Since the range of pixels diffused by the filter is within one pixel adjacent in the scanning line direction, it is necessary to judge on the basis of the proximal pixel group excluding the adjacent pixel including the defect from among the pixels before and after the pixel of notice. To remove the adjacent pixel containing the defect, if the pixel of notice has a white spot, the larger one of the preceding and succeeding pixels is removed, and if the pixel of notice has a black spot, the smaller one of the preceding and succeeding pixels is removed. In other words, in the proximal pixel value group, the pixel value of the pixel existing at the closet position in the pixel group existing in the right direction on the same scanning line as the pixel of notice is denoted Pr, the pixel value of the pixel existing at the closest position in the pixel group existing in the left direction on the same scanning line is denoted Pl, and the pixel value group excluding Pr, Pl from the proximal pixel value group is denoted Po. The white spot is judged by comparing the pixel of notice with the maximum value from among Po and the smaller one of Pr and Pl, that is max (min (Pr, Pl), Po). Likewise, the black spot is judged by comparing the pixel of notice with the minimum value from among Po and the larger one of Pr and Pl, that is, min (max (Pr, Pl), Po).

FIG. 1 is a schematic block diagram in a first embodiment of the invention, and the constitution is similar in the second embodiment, also, and the following explanation is given by reference to FIG. 1. In FIG. 1, in the second embodiment, the input terminal 1 is provided with a brightness signal or color difference signal obtained by executing digital filter processing on the output of the solid-state pickup device having a color filter array on the basis of the complete color differential line sequential single chip CCD color system.

In FIG. 1, the candidate pixel value group sampler 3 delivers Ymax which is the maximum pixel value from among the smaller of pixel values c4 and c5 and the remaining proximal pixel values, and Ymin which is the minimum pixel value from among the larger of pixel values c4 and c5 and the remaining proximal pixel values, from among the pixel value group c of the proximal pixels delivered simultaneously from the pixel value group sampler 2. These Ymax and Ymin are candidate pixel values.

Figure 6:
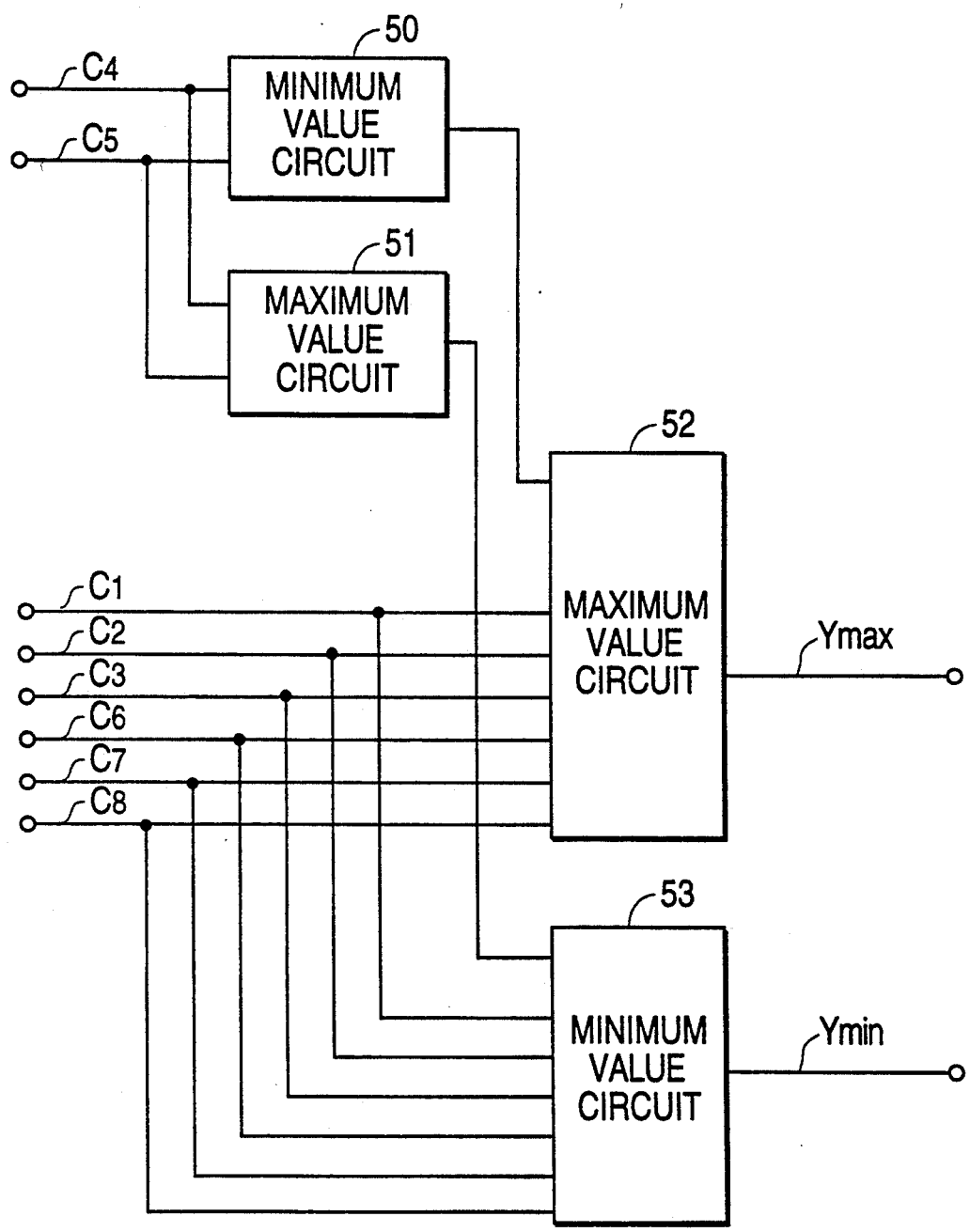
FIG. 6 depicts a configuration of a candidate pixel value group sampler in a second embodiment of the invention.

FIG. 6 is a specific constitutional example of the candidate pixel value group sampler 3. In FIG. 6, in conjunction with the explanation of the pixel value group sampler 2, an example is shown of a constitution of the candidate pixel value group sampler 3 in which the proximal pixel group is composed of 8 pixels. The sampler 3 is composed of a maximum value circuit 51 and minimum value circuit 50 having two input terminal groups, and a maximum value circuit 53 and minimum value circuit 52 having seven input terminal groups. The minimum value circuit 50 delivers the smaller one of the pixel values c4 and c5 respectively positioned one pixel before and after the pixel of notice from among the input proximal pixel value group c, and the maximum value circuit 52 samples and delivers the maximum pixel value (Ymax) from among the output of the minimum value circuit 50 and the remaining proximal pixel value c1, c2, c3, c6, c7, c8. The maximum value circuit 51 delivers the larger one of the pixel values c4 and c5 respectively positioned one pixel before and after the pixel of notice from among the input proximal pixel value group c, and the minimum value circuit 53 samples and delivers the minimum pixel value (Ymin) from among the output of the maximum value circuit 51 and the remaining pixel value c1, c2, c3, c6, c7, c8.

In FIG. 1, meanwhile, the constituent elements other than the candidate pixel value group sampler 3 are the same as in the first embodiment, and the explanation thereof is omitted below.

Figure 9A:
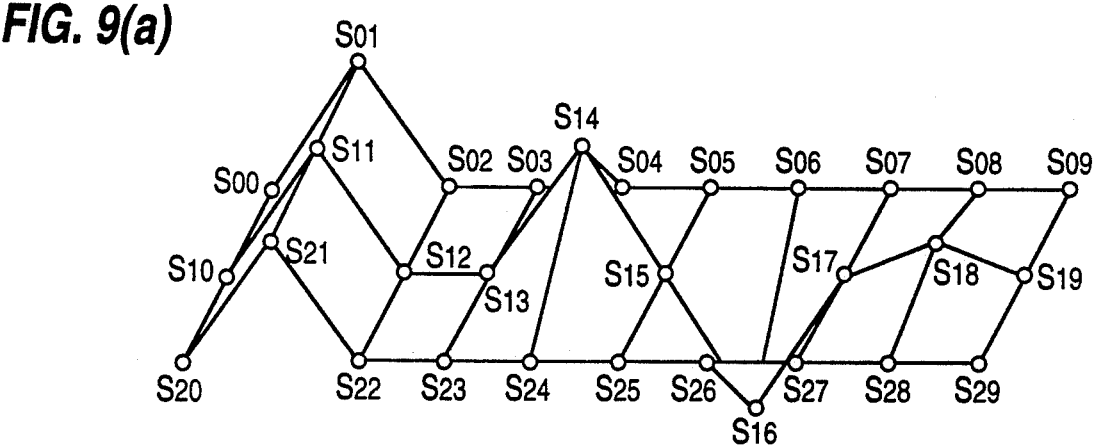
FIGS. 9(a), 9(b) and 9(c) are explanatory diagrams related to the operation of the second embodiment of the invention.
Figure 9B:
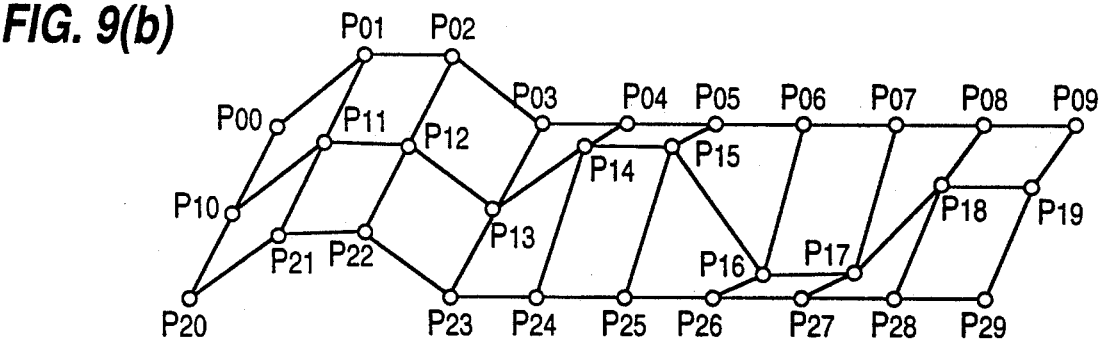
Figure 9C:
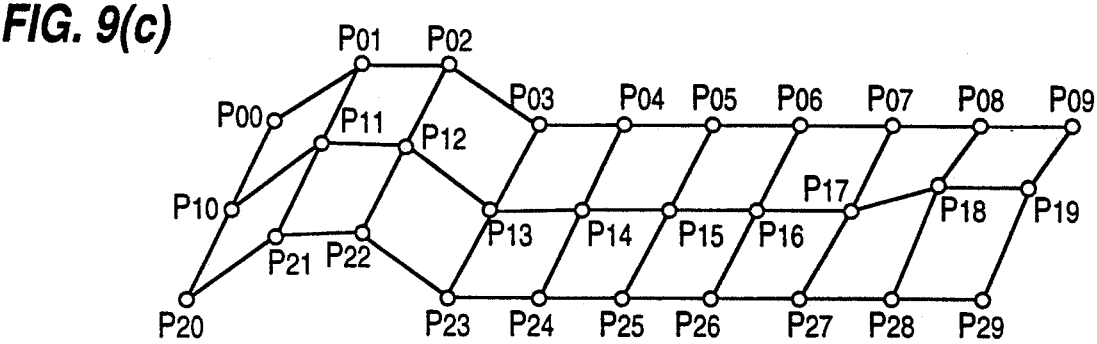

Referring now to FIGS. 9(a), 9(b) and 9(c), the operation of the second embodiment of the invention is explained below. FIGS. 9(a), 9(b) and 9(c) are partially cut-out views of the video signal in one field, in which the axes of the scanning line and the component vertical to the scanning line are plotted in the horizontal direction and depthwise direction, respectively, and the pixel values are shown in the vertical direction. FIG. 9(a) is an example of a signal delivered from the solid-state pickup device having a color filter array on the basis of the complete color differential linear sequential single plate color system. For the simplicity of explanation, a monochromatic picture is shown. FIG. 9(b) shows a signal after execution of a $(1+Z^{-1})$ digital filter on the signal shown in FIG. 9(a), and this filtered signal is fed to the input terminal 1 shown in FIG. 1. FIG. 9(c) shows a signal delivered from the output terminal 1 shown in FIG. 1 after input of the filtered signal.

In FIG. 9(a), S01, S11, S21 express sharp line segments existing in the vertical direction to the scanning line, and S14 denotes a white spot and S16 a black spot, and S18 expressed a fine detail included in the original picture. Here, all of the pixel values of pixels S01, S11, S21, S14 are 200, the pixel value of pixel S16 is 0, the pixel value of pixel S18 is 140, and all of pixel values of the remaining pixels are 100, for example. In FIG. 9(b), by operation of the digital filter, all pixel values of pixel P01, P02, P11, P12, P21, P22, P14, P15 are 150, the pixel values of pixels P16, P17 are 50, the pixel values of pixels P18, P19 are 70, and all pixel values of the remaining pixels are 100.

Suppose THmax and THmin are both 30.

Assuming the pixel of notice to be P11, Ymax delivered from the candidate pixel value group detector 3 is 150 and Ymin is 100, and at the noise detector 4, DIFmax is 0 and DIFmin is −50, and neither Condition 1 nor 2 is established, and both SELmax and SELmin are inactive, and the pixel value of the pixel of notice P11 is delivered by the pixel value selector 5. When the pixel of notice is P01, P02, P12, P21 or P22, similarly, the pixel value of the pixel of notice is delivered, and the line segment in the vertical direction to the scanning line composed of P01, P02, P11, P12, P21, P22 is preserved. The same holds true also in the line segments in the oblique direction and horizontal direction to the scanning line.

Alternately, if the pixel of notice is P14 or P15, both Ymax and Ymin are 100, and DIFmax is 50 while DIFmin is −50, and only Condition 1 is established, and SELmax is active and SELmin is inactive, and the pixel value selector 5 delivers 100 as the pixel value, so that P14 and P15 are replaced to be flat relative to pixel values of the surrounding pixels. When the pixel of notice is P16 or P17, contrary to the case in which P14 or P15 is the pixel of notice, only Condition 2 is established, and SELmax is inactive and SELmin is active, and the pixel value selector 5 delivers 100 as the pixel value, and therefore P16 and P17 are replaced so as to be flat relative to the pixel value of the surrounding pixels.

When the pixel of notice is P18, DIFmax is 20, and DIFmin is −20, and neither Condition 1 nor 2 is established, and the pixel value selector 5 delivers the pixel value of P18 directly, and the detail component included in the original video signal is preserved.

Finally the output as shown in FIG. 9(c) is obtained.

Alternately, in a method other than the single plate color differential color method, if the pixel defect spreads in the horizontal direction, the pixel defects may be eliminated in such a constitution as in the second embodiment.

What is claimed is:

1. A pixel defect removing circuit comprising:
   a pixel value group sampler for receiving a video signal, and delivering a pixel value of a pixel of notice noted at a certain time t and a proximal pixel value group consisting of pixel values of a group of proximal pixels adjacent to the pixel of notice two-dimensionally around the pixel of notice;
   a candidate pixel value group sampler for delivering, as candidates for a pixel value to be finally delivered from said circuit, a group of plural candidate pixel values from among the pixel values of said proximal pixel value group;

a noise detector for performing an operation to determine, based on the pixel value of the pixel of notice and the candidate pixel values, whether the pixel value of the pixel of notice is a pulse noise and to determine which pixel value should be finally delivered from said circuit from among the pixel value of the pixel of notice and the candidate pixel values, and for delivering a pixel selection signal indicative of the pixel value which is determined to be finally delivered from said circuit; and a pixel value selector for selecting and delivering one pixel value from among the pixel value of the pixel of notice and the candidate pixel values on the basis of the pixel selection signal;

wherein the pixel value group sampler passes an input signal through a multi-stage vertical delay circuit composed of a cascade connection of n scanning line delay units for delaying for a time corresponding to one scanning line period, and picks up respective signals from an input and output of the multi-stage vertical delay circuit and signal wires among the scanning line delay units, thereby creating m+1 video signals delayed in every one scanning line period, and each one of the generated m+1 video signals is passed into a multi-stage horizontal delay circuit composed of a cascade connection of m pixel delay units for delaying for a time corresponding to a display period of x pixels, and each signal is taken out of an input and output of n+1 multi-stage horizontal delay circuits and signal wires in the pixel delay units so as to obtain a group of pixel values of (n+1) by (m+1) pixels, and the pixel value of a specific position among the pixel value group is selected as the value of the pixel of notice, while the remaining pixel values are delivered as the proximal pixel value group, where x, m, n are integers equal to or greater than 1.

2. A pixel defect removing circuit of claim 1, wherein, in the pixel value group sampler, m=n=2.

3. A pixel defect removing circuit of claim 1, wherein both m and n are even numbers, and wherein the position of the pixel of notice is in the two-dimensional center of said (n+1) by (m+1) pixels.

4. A pixel defect removing circuit comprising:
a pixel value group sampler for receiving a video signal, and delivering a pixel value of a pixel of notice noted at a certain time t and a proximal pixel value group consisting of pixel values of a group of proximal pixels adjacent to the pixel of notice two-dimensionally around the pixel of notice;

a candidate pixel value group sampler for delivering, as candidates for a pixel value to be finally delivered from said circuit, a group of plural candidate pixel values from among the pixel values of said proximal pixel value group;

a noise detector for performing an operation to determine, based on the pixel value of the pixel of notice and the candidate pixel values, whether the pixel value of the pixel of notice is a pulse noise and to determine which pixel value should be finally delivered from said circuit from among the pixel value of the pixel of notice and the candidate pixel values, and for delivering a pixel selection signal indicative of the pixel value which is determined to be finally delivered from said circuit; and a pixel value selector for selecting and delivering one pixel value from among the pixel value of the pixel of notice and the candidate pixel values on the basis of the pixel selection signal;

wherein Pr denotes a pixel value of a one of said group of proximal pixels which is located at a position closest to the pixel of notice in a first direction on a scanning line containing the pixel of notice, Pl denotes a pixel value of another one of said group of proximal pixels which is located at a position closest to the pixel of notice in a second direction opposite the first direction on the scanning line, and Po denotes the pixel values of the proximal pixel value group excluding Pr and Pl, and wherein the candidate pixel value group sampler delivers, as the candidate pixel values, a maximum pixel value from among Po and a smaller one of Pr and Pl and a minimum pixel value from among Po and a larger one of Pr and Pl.

5. A pixel defect removing circuit comprising:
a pixel value group sampler for receiving a video signal, and delivering a pixel value of a pixel of notice noted at a certain time t and a proximal pixel value group consisting of pixel values of a group of proximal pixels adjacent to the pixel of notice two-dimensionally around the pixel of notice;

a candidate pixel value group sampler for delivering, as candidates for a pixel value to be finally delivered from said circuit, a group of plural candidate pixel values from among the pixel values of said proximal pixel value group;

a noise detector for performing an operation to determine, based on the pixel value of the pixel of notice and the candidate pixel values, whether the pixel value of the pixel of notice is a pulse noise and to determine which pixel value should be finally delivered from said circuit from among the pixel value of the pixel of notice and the candidate pixel values, and for delivering a pixel selection signal indicative of the pixel value which is determined to be finally delivered from said circuit; and a pixel value selector for selecting and delivering one pixel value from among the pixel value of the pixel of notice and the candidate pixel values on the basis of the pixel selection signal;

wherein Pmax denotes a maximum pixel value among the candidate pixel value group, and wherein the noise detector judges that the pixel value of the pixel of notice is a pulse noise when the pixel value of the pixel of notice is larger than Pmax and a difference between the pixel value of the pixel of notice and Pmax is larger than a predetermined threshold value, and delivers a selection signal indicating Pmax as the pixel value which should be finally delivered from said circuit.

6. A pixel defect removing circuit of claim 5, wherein the pixel value selector delivers Pmax when the selection signal indicates Pmax.

7. A pixel defect removing circuit of claim 5, further comprising a means for changing the predetermined threshold value.

8. A pixel defect removing circuit comprising:
a pixel value group sampler for receiving a video signal, and delivering a pixel value of a pixel of notice noted at a certain time t and a proximal pixel value group consisting of pixel values of a group of proximal pixels adjacent to the pixel of notice two-dimensionally around the pixel of notice;

a candidate pixel value group sampler for delivering, as candidates for a pixel value to be finally delivered from said circuit, a group of plural candidate pixel values from among the pixel values of said proximal pixel value group;

a noise detector for performing an operation to determine, based on the pixel value of the pixel of notice and the candidate pixel values, whether the pixel value of the pixel of notice is a pulse noise and to determine which pixel value should be finally delivered from said circuit from among the pixel value of the pixel of notice and the candidate pixel values, and for delivering a pixel selection signal indicative of the pixel value which is determined to be finally delivered from said circuit; and a pixel value selector for selecting and delivering one pixel value from among the pixel value of the pixel of notice and the candidate pixel values on the basis of the pixel selection signal;

wherein Pmin denotes a minimum pixel value among the candidate pixel value group, and wherein the noise detector judges that the pixel value of the pixel of notice is a pulse noise when the pixel value of the pixel of notice is smaller than Pmin and a difference between the pixel value of the pixel of notice and Pmin is larger than a predetermined threshold value, and delivers a selection signal indicating Pmin as the pixel value which should be finally delivered from said circuit.

9. A pixel defect removing circuit of claim 8, wherein the pixel value selector delivers Pmin when the selection signal indicates Pmin.

10. A pixel defect removing circuit of claim 8, further comprising a means for changing the predetermined threshold value.

11. A pixel defect removing circuit comprising:

a pixel value group sampler for receiving a video signal, and delivering a pixel value of a pixel of notice at a certain time t and a proximal pixel value group consisting of pixel values of a group of proximal pixels adjacent to the pixel of notice two-dimensionally around the pixel of notice;

a candidate pixel value group sampler for delivering, as candidates for a pixel value to be finally delivered from said circuit, a group of plural candidate pixel values from among the pixel values of said proximal pixel value group;

a noise detector for performing an operation to determine, based on the pixel value of the pixel of notice and the candidate pixel values, whether the pixel value of the pixel of notice is a pulse noise and to determine which pixel value should be finally delivered from said circuit from among the pixel value of the pixel of notice and the candidate pixel values, and for delivering a pixel selection signal indicative of the pixel value which is determined to be finally delivered from said circuit; and a pixel value selector for selecting and delivering one pixel value from among the pixel value of the pixel of notice and the candidate pixel values on the basis of the pixel selection signal, wherein Pmax and Pmin respectively denote a maximum pixel value and a minimum pixel value among the candidate pixel value group, and wherein the noise detector sets the selection signal to indicate Pmax when the pixel value of the pixel of notice is larger than Pmax and a difference between the pixel value of the pixel of notice and Pmax is larger than a first predetermined threshold value, and sets the selection signal to indicate Pmin when the pixel value of the pixel of notice is smaller than Pmin and a difference between the pixel of value of the pixel of notice and Pmin is larger than a second predetermined threshold value.

12. A pixel defect removing circuit of claim 11, wherein the pixel value selector delivers Pmax and Pmin when the selection signals indicates Pmax and Pmin, respectively, and otherwise delivers the pixel value of the pixel of notice.

13. A pixel defect removing circuit of claim 11, further comprising a means for changing each of the first and second predetermined threshold values.

14. A pixel defect removing circuit of claim 11, wherein the candidate pixel value group sampler delivers, as the candidate pixel values, at least a maximum pixel value and a minimum pixel value from among the proximal pixel value group delivered from the pixel value group sampler.

15. A pixel defect removing circuit of claim 11, wherein Pr denotes a pixel value of a one of said group of proximal pixels which is located at a position closest to the pixel of notice in a first direction on a scanning line containing the pixel of notice, Pl denotes a pixel value of another one of said group of proximal pixels which is located at a position closest to the pixel of notice in a second direction opposite the first direction on the scanning line, and Po denotes the pixel values of the proximal pixel value group excluding Pr and Pl, and wherein the candidate pixel value group sampler delivers, as the candidate pixel values, a maximum pixel value from among Po and a smaller one of Pr and Pl and a minimum pixel value from among Po and a larger one of Pr and Pl.

* * * * *